May 1, 1962  R. H. MALCOLM ETAL  3,032,022
INTERNAL COMBUSTION ENGINE
Filed Oct. 19, 1959  4 Sheets-Sheet 1
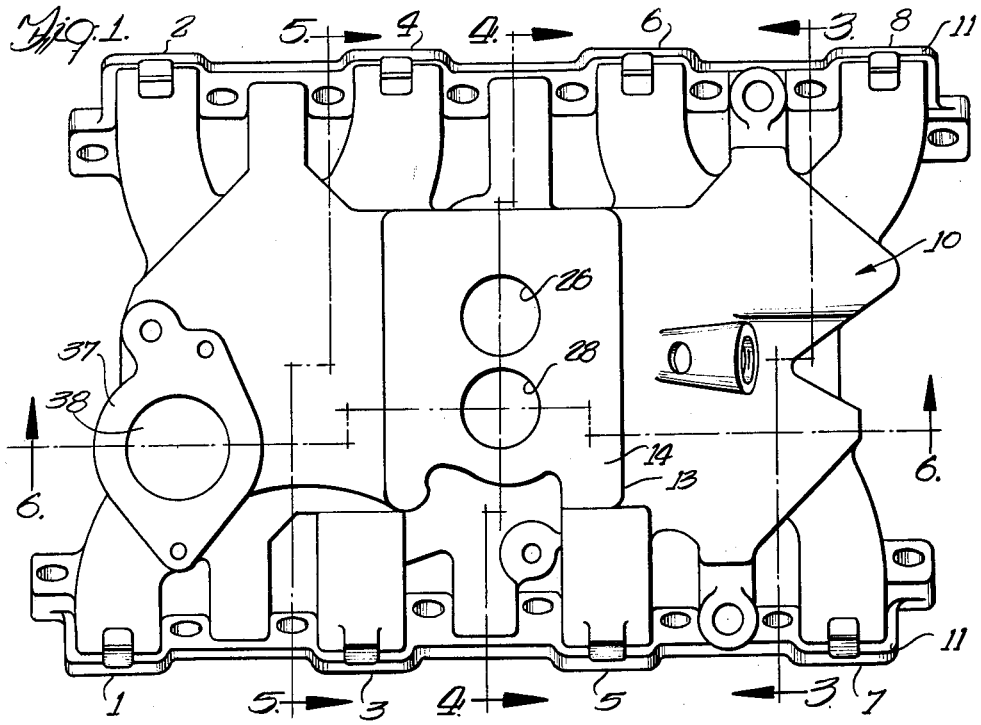
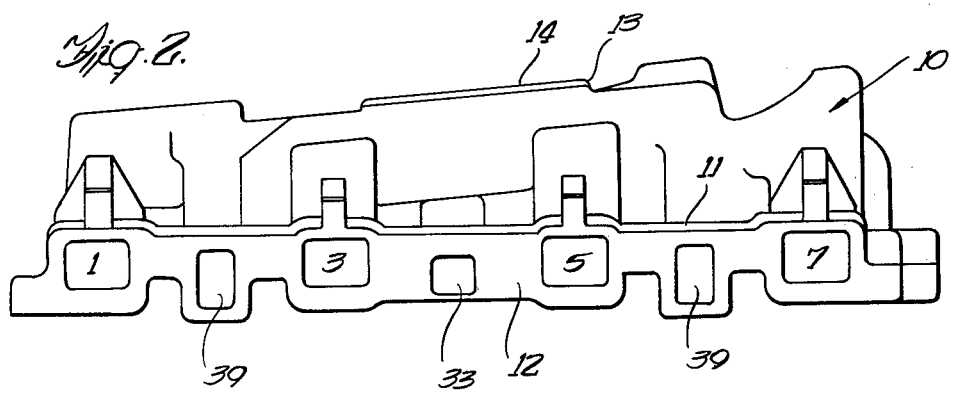
INVENTORS
Robert H. Malcolm
Richard J. Brehm
Paul O. Pippel
ATTORNEY May 1, 1962 R. H. MALCOLM ETAL 3,032,022
INTERNAL COMBUSTION ENGINE
Filed Oct. 19, 1959 4 Sheets-Sheet 2

INVENTORS
Robert H. Malcolm
Richard J. Brehm
Paul O. Pippel
ATTORNEY

May 1, 1962 R. H. MALCOLM ETAL 3,032,022
INTERNAL COMBUSTION ENGINE
Filed Oct. 19, 1959 4 Sheets-Sheet 3
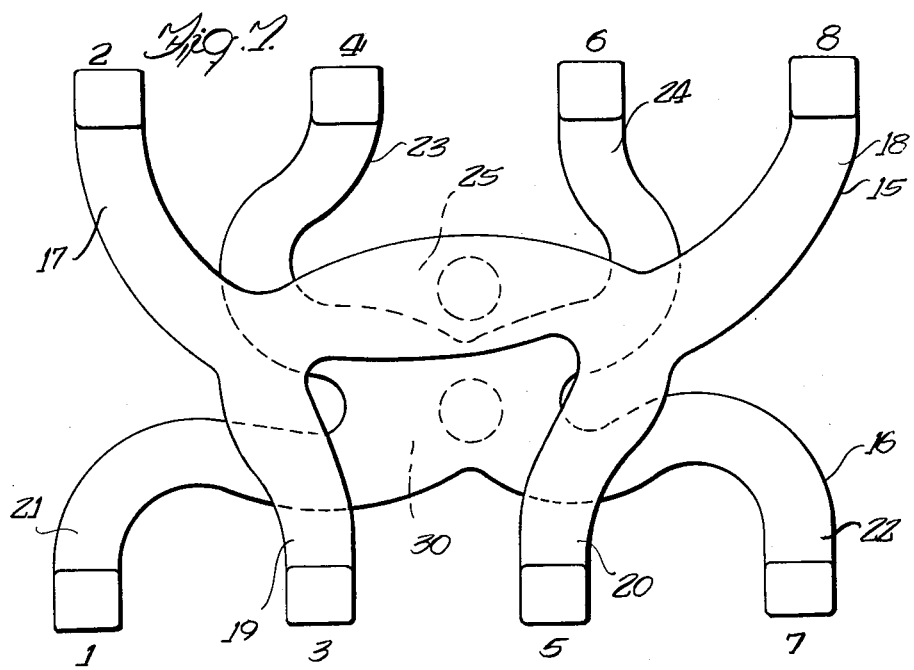
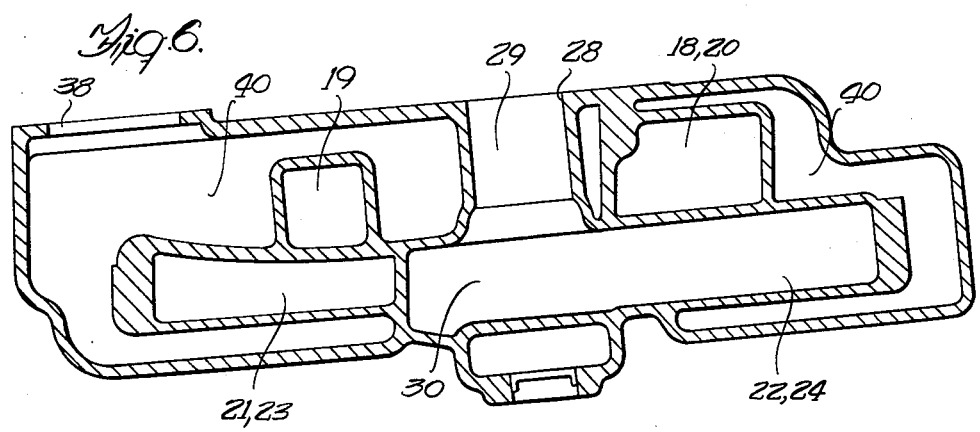
INVENTORS
ROBERT H. MALCOLM
RICHARD J. BREHM
Paul O. Pippel
ATTORNEY May 1, 1962 R. H. MALCOLM ETAL 3,032,022
INTERNAL COMBUSTION ENGINE
Filed Oct. 19, 1959 4 Sheets-Sheet 4

INVENTORS
Robert H. Malcolm
Richard J. Brehm
Paul O. Pippel
ATTORNEY

United States Patent Office 3,032,022
Patented May 1, 1962

3,032,022
INTERNAL COMBUSTION ENGINE
Robert H. Malcolm and Richard J. Brehm, Fort Wayne, Ind., assignors to International Harvester Company, Chicago, Ill., a corporation of New Jersey
Filed Oct. 19, 1959, Ser. No. 847,183
7 Claims. (Cl. 123—52)

This invention relates to inlet manifolds for internal combustion engines and more particularly to a new and improved inlet manifold construction for a carbureted, V-type 8-cylinder internal combustion engine.

One half of the cylinders of a conventional V-type internal combustion engine are generally longitudinally disposed within a cylinder bank which bank is angularly arranged with respect to another bank having the remaining cylinders longitudinally disposed therein. The combustible charge is generally formed in carburetor means and distributed or directed to the various cylinders by means of an intake manifold. Because of the angular disposition of the cylinders and the space limitations in a V-type engine, it has long been the practice to employ a superimposed, double H manifold for conducting the combustible charge from the carburetor means to the various cylinders. Both the upper and lower level sections of the manifold each generally comprises a longitudinally extending duct or passageway having its ends connected with crosswise branch passageways, each of which is arranged to reach a cylinder in a respective cylinder bank. The longitudinally extending passageways in turn are provided with an inlet carburetor riser disposed in the longitudinal center of the passageway and usually arranged vertically. The vertical carburetor risers are, in essence, interconnected through the carburetor means, air cleaner and silencer.

It has long been recognized by engine designers that the maximum power obtainable from an engine is dependent upon the volumetric efficiency of the engine and in order to obtain a high volumetric efficiency in an engine, the induction system must be efficient. An efficient induction system must distribute the mixture of air and fuel at a constant air-fuel ratio equally to each cylinder, should mix the air and fuel to form a homogeneous mixture, should atomize fuel droplets for greater evaporation and to prevent fuel droplets from flowing out of the air stream particularly at low speeds, must conduct the charge at the same temperature to each cylinder, must add heat to the charge for cold operation, must not over-heat the charge so as to decrease power due to the over-expansion of the heated gases entering the cylinder. While superimposed double H section manifolds have to a certain extent fulfilled the requirements required in an efficient induction system for V-type internal combustion engines as evidenced by the wide-spread utilization of such manifolds, the air-fuel mixture distribution characteristics of such manifolds leaves much to be desired. One of the most effective methods to achieve the abovementioned characteristics of an efficient induction system for internal combustion engines is to control the distance traveled by the pressure wave created by any cylinder during its suction stroke in such a manner that the pressure wave must travel the same distance in the manifold as it travels to the other cylinders during their suction strokes and because of certain inherent constructional details of conventional double H section manifolds and the usual firing order V-type 8 cylinder internal combustion engines the distance the pressure wave travels in the manifold to any demand cylinder is not necessarily the same distance the pressure wave travels to each of the other cylinders. Engine designers are also aware of the fact that the direction in which the air-fuel mixture in each manifold section flows from the carburetor riser for consecutive suctions in that respective manifold section is of great importance for equal distribution of gases. Where the pressure wave alternates in direction from the carburetor riser, the distribution to the four cylinders associated with the particular manifold section is more uniform than when the direction is the same between a pair of consecutive demand cylinders. Because of the fact that the usual firing order of V-8 type engines always results in a pair of adjacent cylinders firing 90 degrees apart with respect to each other and since the manifold is divided into an upper and lower manifold section, the firing sequence within any one of the manifold sections is at least 180 degrees apart. Furthermore, since the manifold sections of a superimposed double H section manifold are at two different levels, one manifold section has a carburetor riser length longer than the other. In one of the manifold sections the demand cylinders alternate in sequence from one end of the manifold section to the other so the demand cylinder pressure wave always passes under the carburetor riser thereof. In the other manifold section of a conventional superimposed double H type section manifold the demand cylinder pressure wave does not alternate in sequence from one end to the other but by-passes the carburetor riser thereof and goes directly to the next demand cylinder. Obviously, the suction sequence in the last-mentioned manifold section is such that the intermediate successive suctions in this group are not alternating, one suction going in one direction from the carburetor riser and the next suction going in the same direction therefrom creating a purely unbalanced gas distribution in this group of four cylinders in contradistinction to the first-mentioned manifold section which has a purely balanced gas distribution. It is also obvious that in the manifold section wherein immediate successive suctions do not alternate but rather where one suction goes in one direction from the carburetor riser and the next suction goes in the same direction therefrom the effective length of travel of the demand cylinder pressure wave is not the same between immediate successive suctions since the carburetor riser (which includes for effective length the carburetor and the air cleaner) is not included in every instance but rather is by-passed.

It is therefore a primary objective of the present invention to provide a novel intake manifold construction for a V-type 8-cylinder internal combustion engine wherein the various shortcomings of conventional superimposed double H section manifolds are eliminated and wherein the characteristics of efficient induction system also enumerated above are attained.

Another object is to provide an intake manifold construction wherein the pressure wave travels the same distance between successive demand cylinders.

Still another objective of the present invention is to provide an intake manifold construction wherein the pressure wave of any demand cylinder will pass under a carburetor riser before reaching the next demand cylinder thus making the carburetor riser, carburetor and air cleaner effective to the overall length of the manifold sections and the possibility of a more accurate tuning for dynamic supercharging through common effective ram pipe length.

Still another object of the invention is the new and improved intake manifold construction for a V-type 8-cylinder internal combustion engine comprising a pair of superimposed manifold sections, one of the sections having an H-shape and the other section having an X-shape.

The foregoing and other important objects and desirable features inherent in and encompassed by the invention together with many of the purposes and uses thereof will become readily apparent from a reading of the ensuing description in conjunction with the annexed drawings in which:

FIGURE 1 is a plan view of an intake manifold construction for a V-type 8-cylinder internal combustion engine embodying the invention;

FIGURE 2 is a side elevational view of the manifold construction illustrated in FIGURE 1;

FIGURE 6 is a longitudinal sectional view taken substantially along line 6—6 of FIGURE 1;

FIGURE 7 is a schematic showing of the air-fuel passages of the manifold construction illustrated in FIGURE 1.

Figure 3:
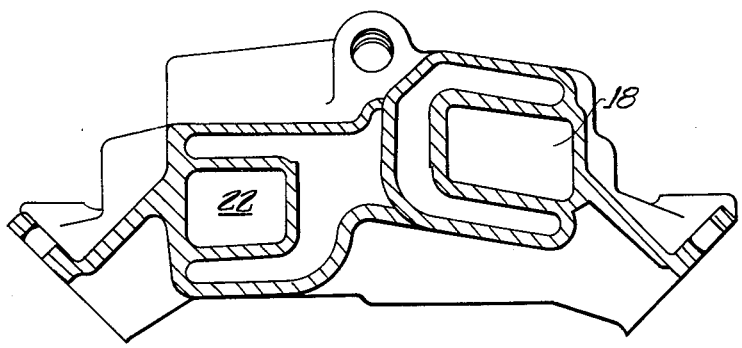
FIGURE 3 is a sectional view taken substantially along the line 3—3 of FIGURE 1.

Referring to the drawings in detail wherein like reference characteristics represent like elements throughout the various views, an intake manifold casting, designated generally by numeral 10 and embodying the invention, is shown. The intake manifold 10 is adaptable for distributing a combusticle air-fuel mixture to the cylinders of a conventional V-type, 8 cylinder engine (not shown) wherein the cylinders are arranged in two angularly related banks, each bank having four longitudinally aligned cylinders. The banks are provided in a cylinder block and secured to the upper end of each bank is a cylinder head having inlet passages leading from each cylinder and opening into a wall surface thereof. Each longitudinal edge of the intake manifold 10 is defined by a mounting flange 11, each of which is adapted to be secured to a wall surface of a respective cylinder head having the cylinder intake passages opening therein in a gas-tight manner by any suitable means. Each mounting flange 11 is provided with a flat finished surface 12 having a plurality of generally rectangular, longitudinally aligned manifold outlet ports opening therein. For convenient reference the outlet ports are numbered 1, 3, 5 and 7 in one surface 12 starting such numbering from one end of the manifold 10 and each outlet port is adapted to be in fluid communication with a respective cylinder of one of the cylinder banks when the manifold 10 is secured to the cylinder heads. In a similar manner the outlet ports opening into the surface 12 of the other mounting flange 11 are numbered 2, 4, 6 and 8, respectively, and each outlet port 2, 4, 6 and 8 is in fluid communication with an intake passage leading to a respective cylinder of the other bank of cylinders.

The uppermost wall of the intake manifold casting when the manifold is assembled on the engine is provided with a slightly raised, centrally located mounting pad 13 having a flat finished face 14 upon which carburetor means (not shown) are secured.

As best shown in FIGURE 7, the intake manifold 10 is internally formed to provide two sections 15, 16 of air fuel mixture distribution passages. The manifold section 15 illustrated diagrammatically in FIGURE 7 is somewhat H-shape in plan and includes passages 17 and 18 in fluid communication with the end cylinders 2 and 8, respectively, of one bank of cylinders and passages 19 and 20 in fluid communication with the middle cylinders 3 and 5, respectively, of the other bank of cylinders. Similarly, the other manifold section 15, which is generally X-shape in plan, includes passages 21 and 22 in fluid communication with the end cylinders 1 and 7, respectively, of one bank of cylinders and passages 23 and 24 in fluid communication with the cylinders 4 and 6, respectively, of the other bank of cylinders. The H-shape manifold section 15, which is generally disposed on a level above the level of the X-shape manifold section 16, includes a generally longitudinally extending passage 25 or distribution chamber having an end thereof opening into the inner ends of the passages 17 and 19 and the opposite end thereof opening into the passages 18 and 20. A circular opening 26 in the surface 14 of the mounting pad 13 defines the end of a vertically disposed carburetor riser 27 which has its lower end opening into the longitudinally extending passage 25 midway between the ends thereof. The circular opening 26 is adapted to be in vertical alignment with a barrel of a conventional downdraft double barrel type carburetor means (not shown) mounted on the mounting pad 13.

Figure 4:
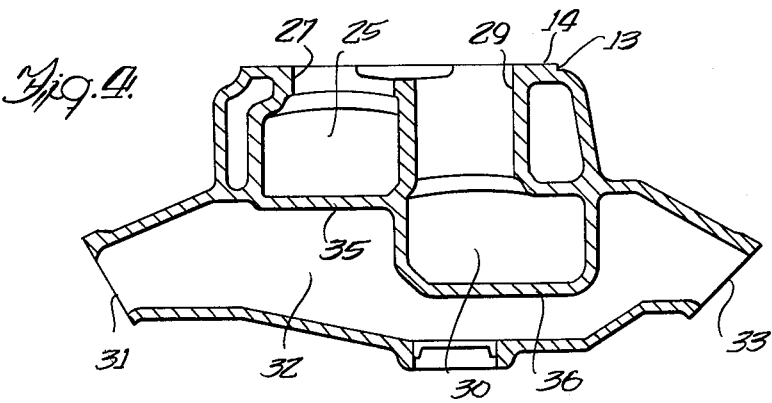
FIGURE 4 is a sectional view taken substantially along line 4—4 of FIGURE 1.
Figure 5:
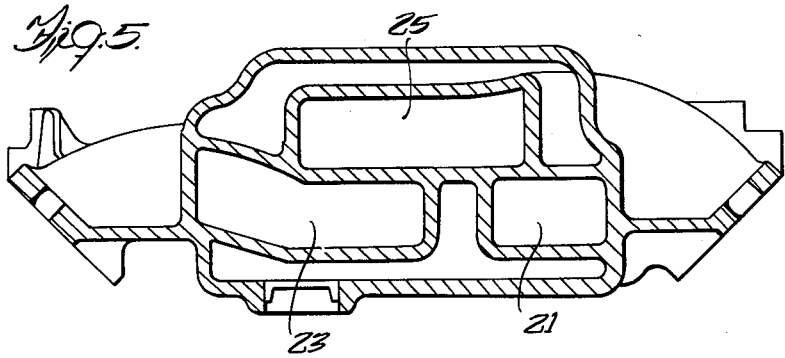
FIGURE 5 is a sectional view taken substantially along line 5—5 of FIGURE 1.

The X-shaped manifold section 16, which generally lies on a somewhat lower level than the H-shaped manifold section 15, is supplied with a combustible mixture of air and fuel through an opening 27 adapted to be in vertical alignment with the other barrel of the double barrel carburetor means. The opening 27 is in transverse alignment with the opening 26 and defines the upper end of a carburetor riser 29. It will be noted that the carburetor riser 29 is considerably longer in length than the carburetor riser 27 because of the generally lower level of the X-shaped manifold section with regard to the level of the H-shaped manifold section 15. The inner ends of the air-fuel mixture distribution passages 21, 22, 23 and 24 unlike the inner ends of the passages 17, 18, 19 and 20 of the H-shaped manifold section 15 are relatively close to each other and open into a distribution chamber designated generally by numeral 30 adjacent the lower end of the carburetor riser 29 which is also in fluid communication therewith as shown in FIGURE 4.

The exhaust manifold structure (not shown) of one of the banks of cylinders is provided with a thermostatically controlled valve which when closed while the engine is running permits the exhaust gases of that cylinder bank to be directed to an inlet port 31 formed in the flat surface 12 in one of the mounting flanges 11. The exhaust gases flow generally transversely of the engine through an exhaust gas crossover passage 32 below the distribution chambers 25 and 30 and is discharged through an outlet port 33, as shown in FIGURE 4, so as to facilitate rapid preheating of the gas or air-fuel mixture being conducted from the carburetor means to the cylinders. The lower walls 35, 36 respectively of the distribution chambers 25, 30 serve as part of the upper wall of the crossover passage 32 whereby heat from the exhaust gases is readily transmitted to the air fuel mixture in the distribution chambers 25, 30. Thus should any of the liquid condense out of the combustile air-fuel mixture and collect on the walls 35, 36, it will immediately vaporize due to the elevated temperature of the walls 35, 36. As soon as the liquid fuel droplets are vaporized, they will mix with the air fuel mixture being drawn into the distribution passages.

Provision is also made in the intake manifold 10 for circulating coolant from the engine cooling system. As in conventional internal combustion engines the temperature of the coolant is controlled and maintained within a particular operating range by means of a thermostatically controlled valve, not shown. The thermostatically controlled valve is adapted to be mounted on a slightly raised flat surface 37 formed at one end of the intake manifold 10. A circular opening or port 38 opens into the surface 37 and serves as a coolant outlet opening. Coolant is admitted into the intake manifold 10 through openings 39 formed in each mounting flange 11. Each opening 39 is adapted to register with a respective water outlet passage in the head when the intake manifold 10 is assembled between the cylinder banks. The coolant flows from the cylinder heads through the ports or openings 39 into interconnected passages 40 substantially encircling the distribution passages 17, 18, 19, 20, 21, 22, 23 and 24 and discharged from the intake manifold 10 through the outlet opening 38.

Figure 8:
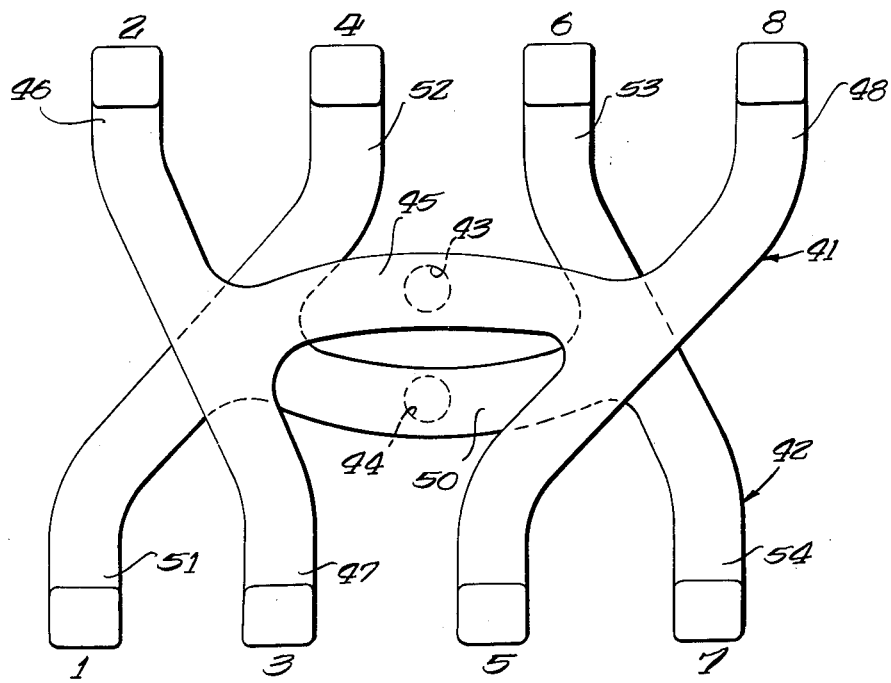
FIGURE 8 is a view similar to FIGURE 7 with the exception that the air-fuel passages of a conventional superimposed double H manifold are schematically illustrated.

Before describing the operation of the intake manifold 10 it is believed a brief résumé of the operational characteristics of a conventional superimposed double H manifold for V-type engines would be beneficial. Referring to FIGURE 8 the air-fuel passages of a conventional superimposed double H manifold are schematically illustrated and the manifold is composed of an upper level H section 41 leading to the manifold outlets for cylinders 2, 3, 5 and 8 and a lower level H manifold section 42 leading to the manifold outlets for cylinders 1, 4, 6 and 7. As in the intake manifold 10 each manifold section 41, 42 is provided with a vertical carburetor riser 43, 44 respectively. The lower end of the carburetor riser 43 is in fluid communication with the mid portion of a generally longitudinally extending passage 45. One end of the longitudinal passage 45 is in fluid communication with the inner ends of distribution passages 46, 47 leading respectively to the manifold outlets for cylinders 2 and 3. The opposite end of the longitudinal passage 45 is similarly in fluid communication with the inner ends of distribution passages 48, 49 extending to the manifold outlet for cylinders 8 and 5 respectively.

The lower level H manifold section 42 leading to the manifold outlet for cylinders 1, 4, 6 and 7 is generally an exact duplicate of the upper level manifold section 41 except that it is reversed or turned in a 180 degree parallel plane. The lower level H manifold section 42 includes a longitudinally extending passage 50 in fluid communication with the carburetor riser 44 and distribution passages 51, 52, 53 and 54. Passages 51 and 52 are connected to one end of the longitudinal passage 50 and lead respectively to the manifold outlet for cylinders 1 and 4 and the opposite end of the longitudinal passage 50 is similarly connected to the distribution passages 53 and 54 leading respectively to the manifold outlet for cylinders 6 and 7.

In the operation of a conventional V-8 internal combustion engine having the usual 90 degree crank pin, two plane arrangement and firing order, a pair of adjacent cylinders always fire 90 degrees apart with respect to each other. Hence the firing sequence within each manifold section 41, 42 is at least 180 degrees apart and each cylinder has an equal suction interval of 180 degrees of crank rotation. Thus assuming the firing order is 1–8–4–3–6–5–7–2, one complete firing cycle of the engine is as follows: The demand cylinder pressure wave or suction impulse is first created in distribution passage 51 and manifold outlet port for cylinder No. 1. Next, the demand cylinder pressure wave is created in distribution passage 48 and manifold outlet opening for cylinder No. 8 followed by suction in distribution passage 52 and outlet opening for cylinder No. 4. Next, suction is created in distribution passage 47 and manifold outlet opening for cylinder No. 3 followed by a suction impulse in distribution passage 53 and manifold outlet opening for cylinder No. 6. Thereupon, the demand cylinder pressure wave next flows in passageway 49 and manifold outlet opening for cylinder No. 5 followed by suction in passageway 54 in communication with cylinder No. 7. Then, suction is next created in passageway 46 and manifold outlet opening for cylinder No. 2 which completes one firing cycle of the engine and at the start of the next firing cycle the demand cylinder pressure wave again flows in passageway 51 in the direction of the manifold outlet opening to cylinder No. 1. From the foregoing it will be appreciated that with a 90 degree crank pin arrangement and a firing order as noted above the suction impulse or pressure wave flows from cylinder No. 1 to cylinder No. 4, then from cylinder No. 4 to cylinder No. 6, from cylinder No. 6 to cylinder No. 7, and then from cylinder No. 6 to cylinder No. 1 in the lower level H manifold section 42, and from cylinder No. 2 to cylinder No. 8, from cylinder No. 8 to cylinder No. 3, from cylinder No. 3 to cylinder No. 5, and from cylinder No. 5 to cylinder No. 8 in the upper level manifold section 41. Hence, in the upper level H manifold section 41 for distributing the air fuel mixture to cylinders 2, 3, 5 and 8, the suction impulse of pressure wave alternate in sequence from one end of the system to the other and always passes under the carburetor riser 43. However, in the lower level H manifold section 42 utilized for distributing the air fuel mixture to cylinders 1, 4, 6 and 7 the suction impulse or pressure wave does not alternate in sequence from one end of the system to the other but rather by-passes the carburetor riser 44 and goes directly to the next demand cylinder. As stated hereinbefore the demand cylinder sequence for the lower level H manifold section 42 is 1, 4, 6 and 7. Thus the pressure wave travels from cylinder No. 1 to cylinder No. 4, the next demand cylinder, directly and by-passes the carburetor riser 44. In the same manner the carburetor riser 44 is by-passed when the pressure wave travels from cylinder No. 6 to cylinder No. 7. Thus a purely unbalanced gas distribution for cylinders 1, 4, 6 and 7 is created in comparison to the other group of cylinders 2, 3, 5 and 8 to which the air fuel mixture distribution is purely balanced. Furthermore, the suction pressure wave does not travel the same length between successive cylinders in the lower level H manifold section 42 because not only are the two manifold sections 41, 42 at different levels but the carburetor riser 44 is not included as part of the passageway means for conducting the pressure wave between successive demand cylinders in the lower level H manifold section 42.

In the intake manifold 10 shown in FIGURE 7, purely balanced air-fuel mixture distribution to all of the engine cylinders is obtained and the distance travelled by the demand cylinder pressure wave between successive demand cylinders is the same throughout the firing cycle of the engine. This is accomplished by including the carburetor risers 27 and 29, which also includes the carburetor means and air cleaner for effective length, as part of the total distance the pressure wave travels between successive demand cylinders throughout the firing cycle of the engine. In essence this is accomplished in the intake manifold structure 10 of the present invention by substituting the X-shaped manifold section 16 for one of the conventional H-shaped manifold sections usually found in conventional superimposed double H manifolds.

The lower level manifold section 16 leading to the manifold outlets for cylinders 1, 4, 6 and 7 is generally X-shaped in plan as stated hereinbefore. The inner ends of the air-fuel mixture distribution passages 21, 22, 23 and 24 leading, respectively, to the manifold outlets for cylinders 1, 7, 4 and 6, unlike the inner ends of the passages 51, 52, 53 and 54 of the lower level H-shaped manifold section of a conventional superimposed double H manifold are relatively close to each other and open directly into the distribution chamber 30. The distribution passages 21, 22, 23 and 24 extend substantially radially from the vertical axis of the distribution chamber 30 which axis is also the vertical axis of the carburetor riser 29. Inasmuch as the inner ends of the passages 21, 22, 23 and 24 are all relatively close to each other and to the vertical axis of the distribution chamber 30 and carburetor riser 29, it will be appreciated that each distribution passage 21, 22, 23 and 24 is, in essence, in direct fluid communication with the carburetor riser 29. In the operation of a conventional V-8 internal combustion engine constructed with the 90 degree, two plane crank pin arrangement and having a firing order of 1–8–4–3–6–5–7–2 and the flow of the demand cylinder pressure wave or suction impulse in the X manifold section 16 of the intake manifold 10 installed on the engine for distributing the air-fuel mixture during one complete firing cycle of the engine is as follows: The demand cylinder pressure wave or suction impulse is first created in distribution passage 21 and manifold outlet port for cylinder No. 1. Next, the demand cylinder pressure wave is created in distribution passage 23 and manifold outlet opening for cylinder No. 4, followed by suction in distribution passage 24 and outlet opening for cylinder No. 6. Next, suction is created in distribution passage 22 and manifold outlet opening for cylinder No. 7. Thus, as in the conventional H manifold section, the suction impulse pressure wave goes from cylinder No. 1 to cylinder No. 4, then from cylinder No. 4 to cylinder No. 6, and from cylinder No. 6 to cylinder No. 7. It will be appreciated that because of the configuration of the manifold section 16, the pressure wave as it travels from cylinder No. 1 through distribution passage 21 to cylinder No. 4 through distribution passage 23, of necessity, must pass through the distribution chamber 30 below the lower end of the carburetor riser 29. In the same manner the pressure wave when traveling from cylinder No. 6 to cylinder No. 7, must flow directly under the carburetor riser 29. Thus the pressure wave created by any demand cylinder will pass under a riser before reaching the next demand cylinder and, hence, the riser as well as the carburetor means and air cleaner in fluid communication with the riser are made effective to the overall length of all of the distribution passages and a purely balanced gas distribution is achieved. The difference in the lengths of the risers 29 and 27 is rendered small percentage-wise in comparison with the total distance the pressure wave travels between successive demand cylinders. However, the difference in riser length can be compensated for, if desired, by constructing the distribution passages 21, 22, 23 and 24 slightly shorter in length than the distribution passages 17, 18, 19 and 20 of the upper level manifold section 15. The embodiment of the invention chosen for the purposes of illustration and description herein is that preferred for achieving the objects of the invention and for developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. An intake manifold for an internal combustion engine having eight cylinders arranged in a V in two opposite banks of four cylinders each comprising, a pair of superimposed, integrally formed manifold sections, each of said sections having four distribution passages formed therein, the outer ends of the distribution passages of each section being in communication with the two end cylinders of one of said banks and the two inner cylinders of the other bank, the passages of one of said sections being generally H-shaped in plan and the other section being generally X-shaped in plan, and a pair of vertical carburetor riser passages, the lower end of each of said carburetor riser passages being in fluid communication with a respective one of said manifold sections, said carburetor riser passages being arranged in a side-by-side relation centrally of the intake manifold, the lower end of said carburetor riser in fluid communication with said X-shaped manifold section being disposed at the intersection of the passages of said X-shaped manifold section.

2. An intake manifold adapted to be used on an engine having a pair of angularly disposed banks of cylinders with four cylinders in each of the said banks comprising, a member adapted to be disposed between said banks, a pair of transversely spaced, vertically disposed carburetor riser passages formed in the middle of said member, an air-fuel distribution chamber disposed immediately below each carburetor riser passage and communicating therewith, a connecting passage extending through and having a mid-portion in communication with one of said distribution chambers, eight distribution passages formed in said member, each of said distribution passages having the outer end thereof in communication with a respective one of the cylinders, said eight distribution passages being divided into two sets of four distribution passages each, the distribution passages of one of said sets of distribution passages being generally X-shaped in plan with one of said distribution chambers at the intersection of said distribution passages, the inner ends of the distribution passages of said one of said sets being directly communicative with said one of said chambers, the other set of distribution passages being divided into two pairs of oppositely directed passages, the inner ends of each pair of oppositely directed distribution passages being connected to each other and to a respective end of said connecting passage.

3. An intake manifold for an eight cylinder, V-type internal combustion engine wherein the cylinders are arranged in angularly disposed banks of four cylinders each and the cylinders are numbered consecutively 1, 3, 5 and 7 in one bank and 2, 4, 6 and 8 in the other bank in order of their remoteness from one end of the engine, and the engine has a firing order of 1–8–4–3–6–5–7–2, comprising, a pair of superimposed integrally formed manifold sections secured to the engine between the cylinder banks, a pair of air-fuel mixture distribution chambers, each of said distribution chambers being in a respective manifold section and disposed on a respective opposite side of a vertical plane containing the longitudinal axis of the engine, one of said manifold sections having a connecting passage formed therein extending through and having a mid-portion thereof in communication with one of said distribution chambers, each of said manifold sections having four distribution passages formed therein, the outer ends of the passages of one of said manifold sections being in communication with cylinders 1, 4, 6 and 7 and the outer ends of the distribution passages of the other manifold section being in communication with cylinders 2, 3, 5 and 8, the inner ends of said passages of said manifold section in communication with cylinders 1, 4, 6 and 7 being in direct communication with each other and one of said distribution chambers, said one of said distribution chambers being disposed between said vertical plane and the outer ends of said distributional passages in communication with cylinders 1 and 7, the inner ends of said distribution passages of said other manifold section in communication with cylinders 2 and 3 being in communication with each other and a respective end of said connecting passage and the inner ends of said distribution passages of said other manifold section communicating with cylinders 5 and 8 being in communication with each other and the opposite end of said connecting passage.

4. An intake manifold adapted to be used on an engine having a pair of angularly disposed banks of cylinders with four cylinders in each of said banks comprising, a member adapted to be disposed between said banks, a pair of air-fuel mixture distribution chambers formed in said member, a connecting passage extending through and having a mid-portion thereof in communication with one of said distribution chambers, eight distribution passages formed in said member, each of said distribution passages having the outer end thereof in communication with a respective one of said cylinders, the said eight distribution passages being divided into two sets of four distribution passages each, one of said sets being divided into two pairs of oppositely directed distribution passages, the inner ends of each pair of said oppositely directed distribution passages being connected to each other and to a respective end of said connecting passage, the distribution passages of the other of said sets of distribution passages being generally X-shaped in plan with the inner ends of the distribution passages thereof in direct communication with said distribution chamber not having the connecting passage extending therethrough, said distribution chamber in communication with the inner ends of the set of distribution passages generally X-shaped in plan being disposed at the intersection of such distribution passages in plan.

5. An intake manifold as set forth in claim 4 wherein said air-fuel mixture distribution chambers are arranged centrally of the member in a side-by-side relation, one of said distribution chambers being vertically spaced above the other.

6. An intake manifold for an eight cylinder, V-type internal combustion engine wherein the cylinders are arranged in angularly disposed banks of four cylinders each and the cylinders are numbered consecutively 1, 3, 5 and 7 in one bank and 2, 4, 6 and 8 in the other bank in order of their remoteness from one end of the engine, and the engine has a firing order of 1-8-4-3-6-5-7-2, comprising, a pair of superimposed integrally formed manifold sections secured to the engine between the cylinder banks, a pair of air-fuel mixture distribution chambers disposed on respective opposite sides of a vertical plane containing the longitudinal axis of the engine, each of said distribution chambers being in a respective manifold section, one of said manifold sections having a connecting passage formed therein extending through and having a midportion thereof in communication with one of said distribution chambers, each of said manifold sections having four distribution passages formed therein, the outer ends of the passages of one of said manifold sections being in communication with cylinders 1, 4, 6 and 7 and the outer ends of the distribution passages of the other manifold section being in communication with cylinders 2, 3, 5 and 8, the inner ends of said passages of said manifold section in communication with cylinders 1, 4, 6 and 7 being in direct communication with each other and one of said distribution chambers and the distribution passages thereof being generally X-shaped in plan, said one of said distribution chambers being disposed between said vertical plane and the outer ends of said distribution passages in communication with cylinders 1 and 7, the distribution passages of the other manifold section in communication with cylinders 2, 3, 5 and 8 being divided into two pairs of oppositely directed passages, the inner ends of each pair of oppositely directed distribution passages being connected to each other and to a respective end of said connecting passage.

7. An intake manifold for an eight cylinder, V-type internal combustion engine wherein the cylinders are arranged in angularly disposed banks of four cylinders each and the cylinders are numbered consecutively 1, 3, 5 and 7 in one bank and 2, 4, 6 and 8 in the other bank in order of their remoteness from one end of the engine, and the engine has a firing order of 1-8-5-3-6-5-7-2, comprising, a pair of superimposed integrally formed manifold sections extending between and secured to the engine between the cylinder banks, a pair of vertically disposed carburetor riser passages, each of said carburetor riser passages being formed in a respective manifold section and being disposed on a respective opposite side of a vertical plane containing the longitudinal axis of the engine, said carburetor riser passages being arranged in a side-by-side relation, a pair of air-fuel mixture distribution chambers, each of said distribution chambers being in a respective manifold section and disposed immediately below and in communication with a respective carburetor riser passage, one of said manifold sections having a connecting passage formed therein extending through and having a midportion thereof in communication with one of said distribution chambers, each of said manifold sections having four distribution passages formed therein, the outer ends of the distribution passages of one of said manifold sections being in communication with cylinders 1, 4, 6 and 7 and the outer ends of the distribution passages of the other manifold section being in communication with cylinders 2, 3, 5 and 8, the inner ends of said passages of said manifold section in communication with cylinders 1, 4, 6 and 7 being adjacent the vertical axis of one of said carburetor riser passages and being in direct communication with each other and one of said distribution passages, the vertical axis of said one of said carburetor riser passages being disposed between said vertical plane and the outer ends of said distribution passages in communication with cylinders 1 and 7, the inner ends of said distribution passage of said other manifold section in communication with cylinders 2 and 3 being in communication with each other in a respective end of said connecting passage and the inner ends of said distribution passages of said other manifold section communicating with cylinders 5 and 8 being in communication with each other and the opposite end of said connecting passage.

References Cited in the file of this patent

UNITED STATES PATENTS

| | | |
|---|---|---|
| 2,759,463 | Platner | Aug. 21, 1956 |
| 2,793,625 | Kolbe | May 28, 1957 |
| 2,948,274 | Wood | Aug. 9, 1960 |